United States Patent

Narai et al.

[11] Patent Number: 5,611,250
[45] Date of Patent: Mar. 18, 1997

[54] ROLLING/SLIDING PART

[75] Inventors: Hiroshi Narai; Satoshi Kadokawa, both of Fujisawa; Yasuyuki Shimazaki, Annaka; Hiroshi Iwasa, Fujisawa, all of Japan

[73] Assignee: NSK, Ltd., Tokyo, Japan

[21] Appl. No.: 493,215

[22] Filed: Jun. 20, 1995

Related U.S. Application Data

[63] Continuation of Ser. No. 93,742, Jul. 20, 1993, abandoned.

[30] Foreign Application Priority Data

Jul. 23, 1992 [JP] Japan .................................. 4-216562
Oct. 21, 1992 [JP] Japan .................................. 4-305848

[51] Int. Cl.⁶ .................................................. F16H 53/06
[52] U.S. Cl. ............................... 74/569; 74/559; 384/912
[58] Field of Search ............................ 74/567, 569, 559; 384/492, 625, 912, 913; 29/898.13; 148/320

[56] References Cited

U.S. PATENT DOCUMENTS

| | | | |
|---|---|---|---|
| 4,659,241 | 4/1987 | Bamberger et al. | 384/625 |
| 5,019,182 | 5/1991 | Arimi | 148/12.1 |
| 5,054,440 | 10/1991 | Kadokawa | 123/90.51 X |
| 5,152,851 | 10/1992 | Yamamoto et al. | 148/333 |
| 5,325,747 | 7/1994 | Santhanam et al. | 82/1.11 |
| 5,361,648 | 11/1994 | Murakami et al. | 74/569 |

FOREIGN PATENT DOCUMENTS

| | | |
|---|---|---|
| 56-17525 | 2/1977 | Japan . |
| 56-150622 | 11/1981 | Japan . |
| 63-44505 | 9/1988 | Japan . |
| 1-3008 | 6/1989 | Japan . |
| 2-17607 | 4/1990 | Japan . |
| 3-117723 | 5/1991 | Japan . |
| 3-117724 | 5/1991 | Japan . |
| 3-117725 | 5/1991 | Japan . |
| 3-199716 | 8/1991 | Japan . |
| 4-54312 | 2/1992 | Japan . |

OTHER PUBLICATIONS

Automotive Engineering (Japan), "Roller Rocker Arm and the Reduction of Friction", Jul. 1989.

*Primary Examiner*—Charles A. Marmor
*Assistant Examiner*—Peter Kwon
*Attorney, Agent, or Firm*—Evenson, McKeown, Edwards & Lenahan, P.L.L.C.

[57] ABSTRACT

The rolling/sliding outer ring of the cam follower apparatus is made to withstand peeling very well, even in severe lubrication conditions, by forming a surface layer in the depth 0 to 50 μm from the outer peripheral surface of the outer ring, such that the maximum residual compressive stress in this surface layer is between 50 and 110 kgf/mm², the hardness of this surface layer is between Hv 830 and Hv 960, and the amount of residual austenite in the surface layer is at least 7 volume %, and formed with continuous minute irregularities on the surface with convexities of the irregularities having an equivalent roundness diameter up to 15 μm for the case that the concavities of the irregularities are assumed to occupy 80% of the total surface area, while the inner peripheral surface of the outer ring is superfinished.

3 Claims, 4 Drawing Sheets

ROLLING/SLIDING PART

This application is a continuation of application Ser. No. 08/093,742, filed on Jul. 20, 1993, now abandoned.

FIELD OF THE INVENTION

The present invention relates to a rolling/sliding part used for example as an outer ring of a cam follower in a valve drive mechanism for an engine.

DESCRIPTION OF THE PRIOR ART

There are many kind of automobile engines including reciprocating piston type engines, all of which except for some 2-cycle engines, have air-intake valves and exhaust valves, which open and close in phase or in synchronization with the rotation of the crank shaft.

A valve drive mechanism is used to transmit the motion of the cam, attached to the cam shaft, to the valves as the cam shaft rotates with the crank shaft of the engine.

There are many kinds of valve drive mechanisms for driving the air-intake valves and exhaust valves. For example, in the valve drive mechanism of a SOCH-type engine, as shown in FIG. 4, the single cam shaft 15 rotates at ½ the speed of the crank shaft 14 (for a 4-cycle engine), to drive the air intake valve 17 and exhaust valve 18 by way of the rocker arms 16. Specifically, the cams 19 are attached to the cam shaft 15 which rotates in phase with the crank shaft 14 of the engine, so that they come in contact with the ends of the rocker arms 16 to reciprocate the air-intake valve 17 and exhaust valve 18.

In recent years, it has been widely practiced to equip the valve drive mechanism with a cam follower, so that when the valve drive mechanism is in operation, the friction that occurs is transformed from sliding friction to rolling friction, thus keeping the friction loss to a minimum.

In order to reduce the friction force, which occurs between the peripheral surface of the cams 19 made of a metal and its mating member such as rocker arms 16 while the engine is running, and in order to reduce fuel consumption when the engine is running, it has become common practice to place a cam follower apparatus, at the point of contact, that rotates with the rotation of the cams 19.

This kind of cam follower apparatus has an outer ring 23 which is placed in a rolling and/or sliding contact with the other parts opposed to the outer ring.

As shown in FIG. 5 thru FIG. 7, a pair of support wall portions 20 with a space therebetween are located at the end of the rocker arm 16 facing the cam 19, and both ends of a shaft 21 are attached to support wall portions 20. A short, cylindrical shaped outer ring 23 is located around this shaft and comes in contact with the shaft 21 by way of rollers 22, or comes in contact with the shaft 21 directly. The outer peripheral surface of this outer ring 23 comes into contact with the outer peripheral surface of cam 19, so that as the cam 19 rotates, the outer ring 23 rotates around the shaft 21.

By using this kind of outer ring 23, the friction, between the cam 19 and the parts that come in contact with it, is changed from sliding friction to rolling friction, thus lowering the fuel consumption rate.

When this kind of cam follower apparatus is installed in the valve drive mechanism of an engine, however, damage, such as pitting, easily occurs on the outer peripheral surface of the cam 19, caused by the fluctuating load that is applied to the outer peripheral surface of the cam 19 by the outer peripheral surface of the outer ring 23.

When the rolling/sliding member such as the outer ring 23 of the cam follower is used in severe lubrication conditions, only the ends of very minute protrusions formed on the surface of the member come in direct contact (metallic contact) with the surface of the mating parts without a film of oil between them. In this case, most of the load applied to the rolling/sliding member Is supported by the several minute protrusions which come In contact with the opposition parts, so that large stress concentrations, together with tangential forces are applied to each minute protrusion.

Due to the stress concentrations and tangential forces, small cracks occur on the surface of the rolling/sliding member, and as these cracks advance, peeling occurs.

In order to prevent friction, the surface of the rolling/sliding member could be made harder, but, by increasing the hardness in such a degree, cracks are more easily caused by the high stress concentrations, which leads to the peeling.

In order to improve the durability of the surface of the rolling and/or sliding member, such as an outer ring 23 used on the cam follower, in rolling and sliding contact with a mating part, many inventions have been proposed in the past with respect to the improvement of the surface condition.

As was described on page 39 of the special issue, "Roller Rocker Arm and the Reduction of Friction", in the July 1989 edition of the magazine, "Automotive Engineering (Japan)", the cam shaft 15 including the cam 19, is made of very strong and hard metal material, such as hardened cast iron, chilled cast iron, hardened steel, or a sintered alloy, that can withstand pitting.

On the other hand, Japanese Patent Publication KOKOKU No. H1-30008 discloses an invention related to a bearing rolling element wherein scratches are formed on the surface of the rolling surface extending in random directions and having a maximum roughness (Rmax) of 0.3 to 1.5 µm (micron), and a residual stress layer with a residual stress of 50kgf/mm$^2$ or more is formed in the surface layer.

Furthermore, Japanese Patent First Publication KOKAI Nos. H3-117723, H3-117724 and H3-117725 disclose inventions wherein a multiplicity of recesses are formed in random directions on the surface by a barreling process, the surface layer hardness is made higher than the interior hardness, and a compressive residual stress is produced in the surface layer.

Moreover, Japanese Patent First Publication KOKAI No. H3-199716 discloses a bearing wherein a surface which comes into contact with a mating part is subjected to a surface hardening process, and the depth of the peak value of the compressive residual stress is made to coincide with the depth of the peak value of the shear stress distribution.

In addition, Japanese Patent First Publication KOKAI No. H4-54312 discloses an invention related to the abovementioned bearing part, wherein a shot peening process is used to produce a compressive residual stress equal to or greater than 100 kgf/mm$^2$ in the surface layer, and equal to or greater than 40 kgf/mm$^2$ in a layer 300 microns below the surface.

Furthermore, Japanese Patent Publication KOKAI No. H2-17607 discloses an invention related to a surface treatment process, wherein 40 to 200 µm shots having a hardness equal to or above that of a metal product are fired at a speed of 100 m/sac or more at the surface of the product, with the temperature in the vicinity of the surface raised to above the A3 transformation point.

With the above known inventions, excellent durability of a product can be achieved depending on the conditions of use. However, when the product is used as a rolling/sliding part in rolling or sliding contact with another part under conditions of insufficient lubrication, which is the object of the present invention, adequate durability is not always possible.

For example, when these inventions are applied to a cam follower apparatus which has an outer ring in a rolling and/or sliding contact relationship with the outer peripheral surface of the cam while the engine is running, peeling may occur, shortening the life of the follower.

In the case where the cam shaft 15 including the cam 19 is made of very strong and hard metal material such as the quench-hardened cast iron as in "Automotive Engineering (Japan)" as mentioned previously, the peeling is inclined to occur on the outer peripheral surface of the outer ring 23 in contact with the cam 19.

Specifically, it is difficult to finish the outer peripheral surface of the cam 19 made of a hard metal material such as the quench-hardened cast iron, and a lot of minute protrusions are formed on the outer peripheral surface of the cam 19, as shown in FIG. 9, which has been subjected to the normal industrial surface finishing method. The surface roughness of the outer peripheral surface is relatively rough, that is about 0.4 µm Ra to 0.8 Ra.

On the other hand, the outer ring 23 is made of bearing steel which is harder than the cam 19, and usually subjected to the superfinish on its surface because the outer ring 23 has a simpler shape and is easier to be processed than the cam shaft 15 including the cam 19.

Accordingly, the outer peripheral surface of the outer ring 23 is smoothly finished as shown in FIG. 8 and FIG. 9 with the surface roughness around 0.05 µm Ra, so that the outer peripheral surface of the outer ring 23 has a limited amount of lubricant 24 on it, which may lead to the occurrence of peeling when the outer ring 23 is installed in a cam follower apparatus and experiences rolling/sliding contact with the outer peripheral surface of the cam during the engine running.

For example, if the amount of lubricant is limited, in the case of an outer ring of a cam follower which makes rolling/sliding contact with the outer peripheral surface of a cam during operation of an engine, the life of the ring can be reduced due to the occurrence of peeling. That is to say, in the case of the valve drive mechanism provided over an engine such as that in a SOHC or DOHC type engine, if an adequate supply of lubricant is not supplied to the valve drive mechanism, then lubrication conditions during operation can become severe. Under these severe conditions with the outer peripheral face of the outer ring 23 in rolling/sliding contact with the outer peripheral face of the cam 19, peeling of the outer diametric face can occur to a depth of 2 to 10 µm, thereby shortening the life of the outer ring 23.

When the abovementioned conventional bearing invention disclosed in Japanese Patent First Publication KOKAI No. H4-54312 is applied to the outer ring 23, peeling endurance becomes inadequate with severe lubrication conditions regardless of the friction conditions. With the product disclosed in Japanese Patent First publication KOKAI No. H3-199716, no particular problems are encountered under pure rolling friction conditions. However if sliding friction occurs, then peeling endurance becomes poor. Moreover with the products disclosed in Japanese Patent Publication KOKOKU No. H1-30008, and Japanese Patent First Publication KOKAI Nos. H3-117723, H3-117724 and H3-117725, peeling endurance becomes inadequate under extreme operating conditions such as severe lubrication conditions and high contact loadings. Also with the product disclosed in Japanese Patent Publication KOKOKU No. H2-17607, adequate peeling endurance cannot be achieved for that product.

Moreover, Japanese Patent First Publication KOKAI NOs. S52-17525, S56-150622, and Japanese Patent Publication KOKOKU No. S63-44505 disclose inventions related to both a process wherein minute grains of shot are fired at a surface to be treated at high speed, and the product of such a process. However, none of the above publications disclose a technology for obtaining a rolling/sliding part having adequate peeling endurance.

The present inventors have previously made an invention (see Japanese Patent Application No. H4-113196) related to a rolling/sliding part which is characterized in that a surface layer in the range from 0 to 50 µm beneath the surface has a maximum compressive residual stress of 50 to 110 kgf/mm$^2$ and a hardness of Hv830 to Hv960, with a surface roughness of the surface having an average wave length of not more than 25 µm, and that the proportion of residual austenite in this surface layer is greater than 7% by volume.

The rolling/sliding part of this prior invention has excellent peeling endurance compared to the inventions disclosed in the various publications mentioned above. However under extremely severe lubrication conditions, it is practically impossible to completely prevent peeling.

SUMMARY OF THE INVENTION

The rolling/sliding part of the present invention addresses the above situation and demonstrates adequate peeling endurance even under severe lubrication conditions.

The rolling/sliding part of the present invention is to be used in rolling or sliding contact with another part opposed to the rolling/sliding part. In particular with rolling/sliding part in one feature of the present invention, a surface is formed with continuous minute irregularities of concavities and convexities, such that when a reference plane is positioned so that the projected area of the concavities occupies 80% of the total projected area, the convexities projecting from the reference plane have an equivalent roundness diameter of up to 15 µm, and a surface layer in the range from 0 to 50 µm beneath the reference plane has a maximum compressive residual stress of 50 to 110 kgf/mm$^2$ a hardness of Hv 830 to Hv960, and a residual austenite content of at least 7% by volume.

In another feature of the present invention, the rolling/sliding part of the present invention is made annular to be in rolling or sliding contact with other parts opposed to the outer and inner peripheral surfaces of it. In particular with rolling/sliding part in the another feature of the present invention, the outer peripheral surface is formed with continuous minute irregularities of concavities and convexities, such that when a reference plane is placed so that the projected area of the concavities occupies 80% of the total projected area, the convexities projecting from the reference plane have an equivalent roundness diameter of up to 15 µm, and a surface layer in the range from 0 to 50 µm beneath the reference plane has a maximum compressive residual stress of 50 to 110 kgf/mm$^2$ a hardness of Hv 830 to Hv960 and a residual austenite content of at least 7% by volume, and the inner peripheral surface is superfinished.

DESCRIPTION OF THE PREFERRED EMBODIMENTS

As follows is an outline of the situation wherein the convexities of the irregularities have an equivalent roundness diameter of up to 15 μm, respectively for the case that the concavities of the irregularities are assumed to occupy 80% in projected area of the total projected area of the surface such as the outer peripheral surface of the outer ring.

Figure 3:
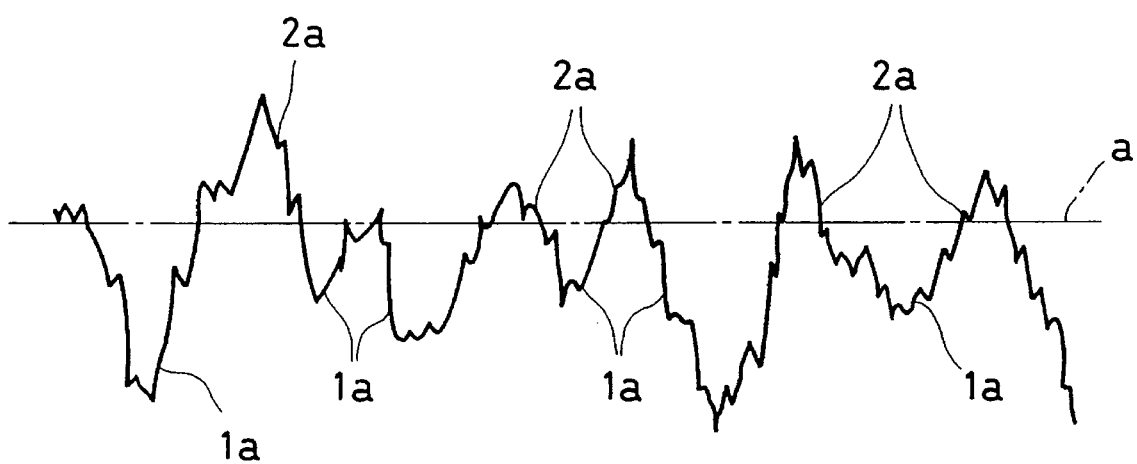
FIG. 3 is a schematic view of a surface condition for binary coding.
Figure 4:
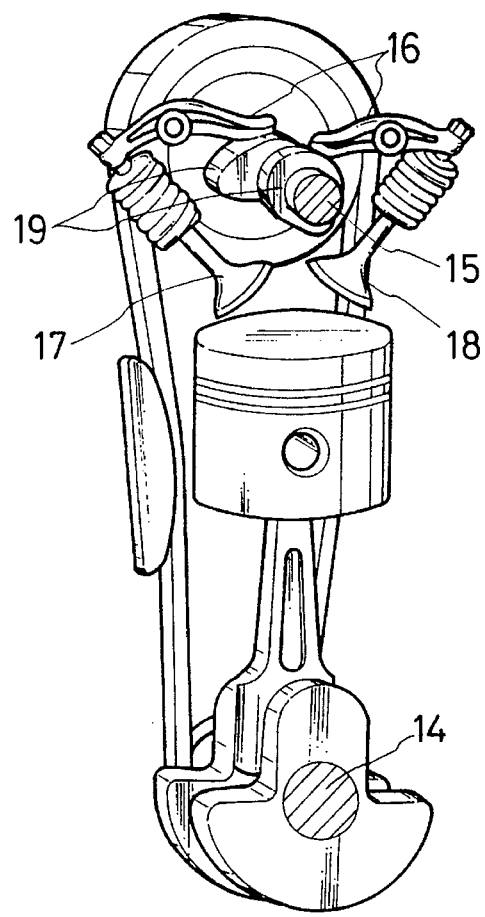
FIG. 4 is a perspective view showing an example of the valve drive mechanism of an engine.
Figure 5:
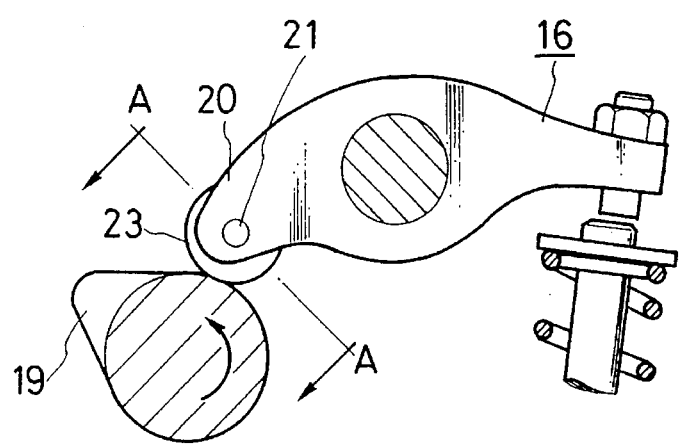
FIG. 5 is a side elevational view of a cam follower apparatus installed in the valve drive mechanism of FIG. 3.
Figure 6:
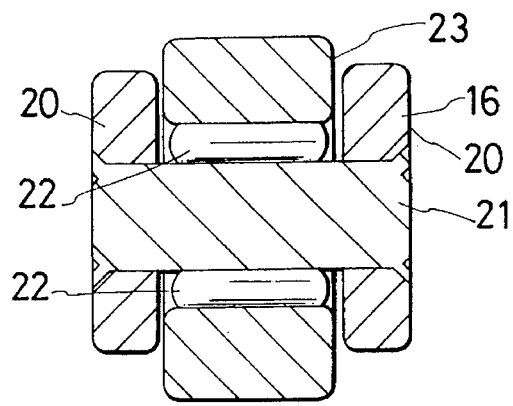
FIG. 6 is a view taken along line A—A of FIG. 4 in a case of the rolling bearing.
Figure 7:
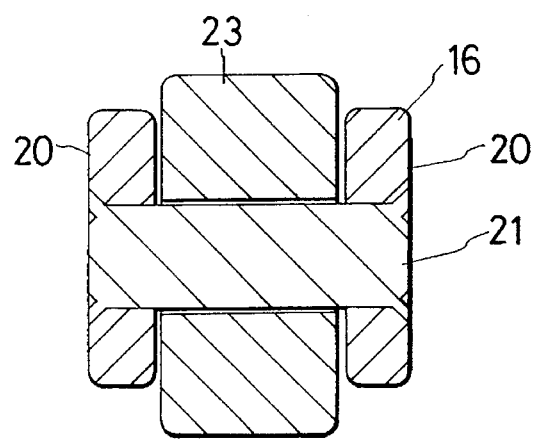
FIG. 7 is a view of taken along line A—A of FIG. 4 in a case of the sliding bearing.
Figure 8:
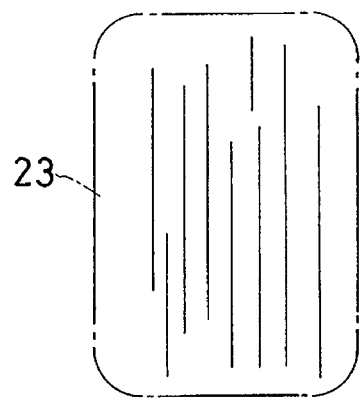
FIG. 8 is a plan view showing scratches remained on the outer peripheral surface of the conventional outer ring.
Figure 9:
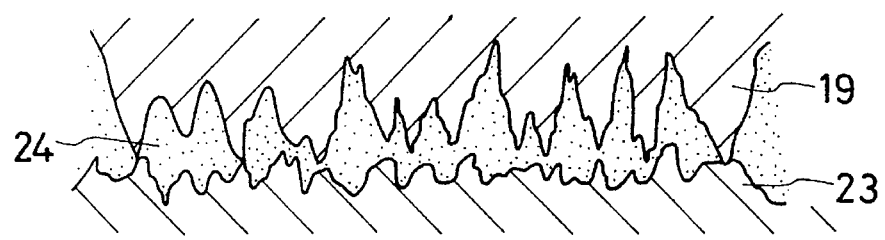
FIG. 9 is an enlarged cross sectional view of a portion of FIG. 8 including the mating surface of the outer ring and the cam.

In this situation, the curve of surface roughness or irregularities such as shown for example in FIG. 3, where the curve is divided by an imaginary straight line "a" parallel to the roughness center line b into the lower and upper parts, designated as the concavities 1a below this line a and the convexities 2a above this line. "a". In FIG. 3, the distance b to c is equal to the distance b to d. The line "a" represents the reference plane for the depth.

The irregularities of the surface indicated by the roughness curve are controlled such that with the straight line "a" assumed to be set at a position wherein the total open surface area of the plurality of concavities 1a is 80% in projected area of the total projected area of the surface of the irregularities, the equivalent roundness diameter of the convexities 2a above the straight line "a" is up to 15 μm, respectively. The projection here is made from above on FIG. 3.

The "equivalent roundness diameter" is the diameter of the circle which has the same area as the projected area of a single convexity. Hypothetical examples of projected area of the convexities 2a are depicted by the hatched irregular circles in FIG. 3.

With the rolling/sliding part e.g. outer ring of the present invention, such as an outer ring of the cam follower apparatus, peeling to a depth of approximately 2 to 10 μm below the surface is effectively prevented, thereby an improvement in durability of the rolling/sliding part or outer ring.

To prevent the occurrence of peeling, it is necessary to ensure that even with use under severe lubrication conditions, a break down in the oil film does not occur at the surface, or that even if a temporary breakdown does occur, provided that this is for only a short period, this is not linked to the occurrence of peeling.

With the occurrence of oil film breakdown at the surface the pair of contacting surfaces make direct contact (metal to metal contact), and the load applied to the rolling/sliding part is almost completely supported by small protrusions in small number in contact with the surface of the mating part.

This results in a large stress concentration at these small protrusions (convexities) with an increase in tangential force.

Due to this stress concentration and tangential force, minute cracks occur in the surface of the rolling/sliding part e.g. outer ring, giving rise to peeling as they progress.

Simply to minimize wear, the surface hardness of the part can simply be increased. However, merely increasing of the hardness still leaves the surface susceptible to peeling related cracking due to stress concentration.

With the rolling/sliding part e.g. outer ring of the present invention in the first feature, since the formation of an oil film on the surface is facilitated, break down of the oil film is less likely to occur even under extreme lubrication conditions, and even if a temporary oil film breakdown does occur, then provided that this is for only a short period, peeling related to cracking does not occur.

That is to say, with the rolling/sliding part e.g. outer ring of the present invention, since minute continuous irregularities are formed on the surface, specifically outer peripheral surface of the outer ring, an effective oil film can be formed on the surface even under severe lubrication conditions so that oil film breakdown can be suppressed. Moreover, since the equivalent roundness diameter of the convexities of the irregularities is up to 15 μm for the case that the concavities of the irregularities are assumed to occupy 80% of the total surface area, efficient oil film formation is achieved, and also the number of minute protuberances of the convexities making contact with the surface of the mating part is increased. Hence the load on the convexities is reduced with an improvement in peeling resistance.

If the equivalent roundness diameter of the convexities exceeds 15 μm, the number of convex and concave portions per unit area becomes smaller so that not only is it easy for the oil film formed on the surface of the rolling/sliding part e.g. the outer peripheral surface of the outer ring to become non-uniform but also, since the load from the mating part is supported by fewer convexities, there is the likelihood of peeling related cracking occurring at these convexities. With the rolling/sliding e.g. outer ring part of the present invention, the equivalent roundness diameter of the convexities of the irregularities is therefore kept to below 15 μm as mentioned above.

Furthermore, since the surface hardness is controlled to be within the range from Hv830 to Hv960, wear is suppressed and peeling related cracking can be prevented In the event of the before mentioned temporary oil film breakdown at the surface provided this is only for a short period. If the abovementioned hardness is less than Hv830, susceptibility to cracking is reduced, however wear becomes excessive, while if the hardness exceeds Hv 960, wear is suppressed, however, the surface becomes susceptible to cracking. Hence in either case life is reduced.

Increasing the maximum compressive residual stress in the surface layer is important for the reason that even in the case of temporary cracking, further propagation of the crack is prevented so that the crack does not become linked to peeling. However, if the surface of the rolling/sliding part e.g. the outer peripheral surface of the outer ring is subjected to treatment whereby the maximum residual compressive stress exceeds 110 kgf/mm$^2$ then the surface hardness goes above Hv960 Hence the maximum value for the maximum compressive residual stress is set at 110 kg/mm$^2$. On the other hand, if the maximum compressive residual stress is made less than 50 kgf/mm$^2$ then the crack propagation suppression effect becomes too small. Hence the minimum value for the maximum compressive residual stress is set at 50 kgf/mm².

If the amount of residual ductile austenite is large, a crack suppression effect can be expected. However, this effect cannot really be relied on unless the residual percentage is over 7% by volume. Furthermore, in order to keep the maximum compressive residual stress and maximum hardness within the beforementioned respective ranges, it is necessary for the residual percentage of the austenite to be above 7% by volume.

Sufficient conditions to ensure that the respective upper limits for the maximum compressive residual stress and hardness of the surface layer portion (i.e. 110 kgf/mm² and Hv960) are not exceeded, require that the decomposition proportion of the austenite accompanying the treatment (i.e. the percentage reduction in austenite due to the treatment) is kept to below 30%. On the other hand, the percentage of austenite contained in a bearing steel such as SUJ2 before the surface treatment, is approximately 11% by volume, and the percentage of austenite of at least 7% by volume must be kept after treatment to ensure that the maximum compressive residual stress and hardness do not exceed the upper limit value. Incidentally, if the shot peening treatment is too soft, the lower limit (i.e. 50 kgf/mm² and Hv830) for the maximum compressive residual stress and hardness will not be reached.

In the first feature of the present invention, applied to the outer ring 23 having an outer peripheral surface in contact with the cam 19 and an inner peripheral surface in contact with the shaft 21 or roller 22, peeling can be prevented from occurring on the outer peripheral surface of the outer ring 23 and of the cam 19, but peeling easily occurs on the rolling surface portions of the roller 22 which is made smooth by superfinishing, or the outer peripheral surface of the shaft 21 is subject to abrasion. The second feature of the present invention overcomes this problem.

Since the inner peripheral surface of the rolling/sliding part such as an outer ring of the cam follower apparatus in the valve drive mechanism in an engine is subjected to superfinishing, the oil film parameter Λ between the superfinished inner peripheral surface of the outer ring and the superfinished outer peripheral surface of the roller or shaft can be enlarged so as to make longer the lives of the inner peripheral surface of the outer ring and the outer peripheral surface of the roller or shaft. The oil firm parameter Λ is expressed by h/σ wherein h is the thickness of EHL oil film and σ is a total roughness.

The following is an example of methods of producing predetermined surface conditions for the rolling/sliding part specifically an outer ring of the present invention, together with an explanation of the experiments carried out by the inventor in order to confirm the results.

In carrying out the experiments, a total of twelve test pieces were prepared as shown in the following table. Five test pieces were prepared according to the present invention, and seven were prepared as comparative test pieces. All test pieces were made of bearing steel (SUJ2), and heat treated in the standard way (heat treated at 800°–850° C. followed by oil-quenching) and then tempered (150°–200°C.) before the outer peripheral surface of the outer ring is subjected to necessary surface treatments. The test pieces were of a short cylindrical shape with an outside diameter of 20 mm, an inner diameter of 13 mm and a thickness of (width) 8 mm.

TABLE 1

| | | | | Outer Peripheral Surface | | | | Inner Peripheral Surface of Outer Ring | |
|---|---|---|---|---|---|---|---|---|---|
| Class | Test Piece No. | Shot peening Process | Surface hardness Hv | Surface residual Stress (max) (kgf/mm2) | Surface residual Austenite (vol %) | Maximum convexity Diameter (microns) | Test cut-off Time (hours) | Finishing Process | Evaluation of Rolling Surface of Roller |
| Present Invention Test Piece | 1 | yes | 830(o) | −50(o) | 10(o) | 10(o) | 400 | SF | ⊚ |
| | 2 | yes | 882(o) | −70(o) | 9(o) | 12(o) | 400 | SF | ⊚ |
| | 3 | yes | 960(o) | −110(o) | 8(o) | 15(o) | 400 | SF | ⊚ |
| | 4 | yes | 904(o) | −80(o) | 9(o) | 13(o) | 400 | SF | ⊚ |
| | 5 | yes | 840(o) | −55(o) | 9(o) | 11(o) | 400 | SF | ⊚ |
| Comparative Example Test Piece | 6 | yes | 830(o) | −50(o) | 10(o) | 23(x) | 90 | SP | x |
| | 7 | yes | 960(o) | −110(o) | 8(o) | 20(x) | 130 | SP | x |
| | 8 | no | 749(x) | +11(x) | 11(o) | 50(x) | 40 | SF | ⊚ |
| | 9 | yes | 835(o) | −45(x) | 10(o) | 10(o) | 90 | SP | x |
| | 10 | yes | 914(o) | −80(o) | 6(x) | 10(o) | 150 | SP | x |
| | 11 | yes | 936(o) | −118(x) | 5(x) | 11(o) | 130 | SP | x |
| | 12 | yes | 980(x) | −130(x) | 4(x) | 12(o) | 110 | SP | x |

SF: Super Finish
SP: Shot Peening

With the outer ring of Test Piece No. 8 of the comparative test pieces, the outer peripheral surface was only polished with polishing cloth, and was not subjected to a surface hardening shot peening process. However, the outer peripheral surfaces of the outer ring of the eleven Test Pieces No. 1 to No. 7 and No. 9 to No. 12, covering the group of comparative test pieces and those of the present invention, were all subjected to a shot peening process using the apparatus shown in FIG. 1 in a similar manner to that disclosed in Japanese Patent First Publication KOKAI No. H4-54312, to harden the surface and produce a significant compressive residual stress in the surface.

Figure 1:
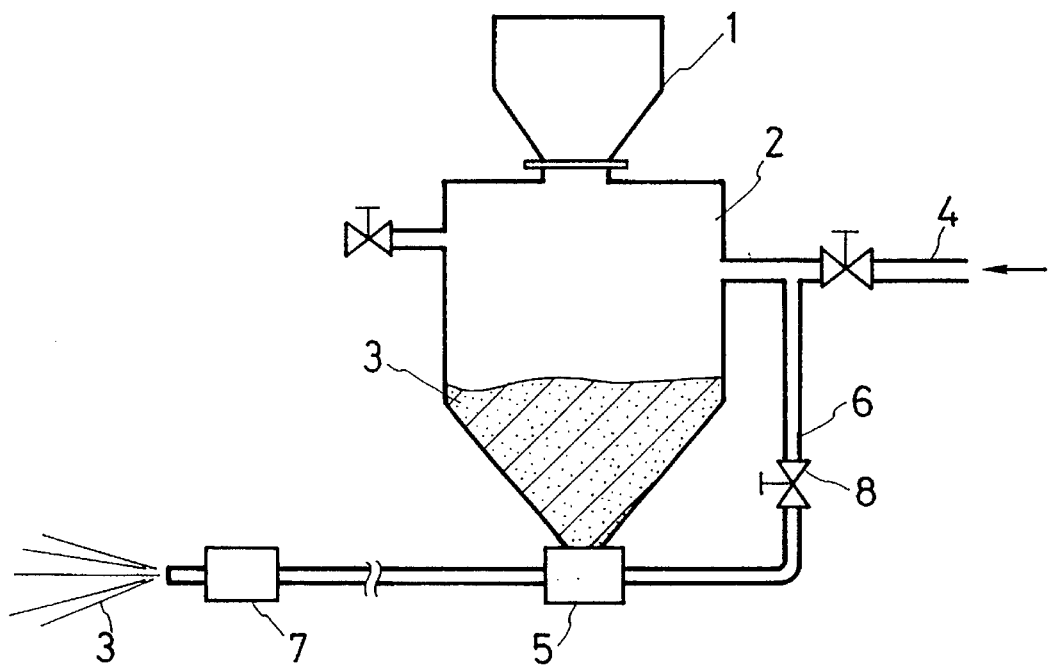
FIG. 1 is a cross-sectional view of a shot peening device used for evaluation in the present invention.

The construction and operation of the shot peening apparatus of FIG. 1 is briefly as follows. Minute shots 3 which are fed into a pressure tank 2 from a hopper 1 are forced into a mixer 5 by compressed air supplied to the pressure tank 2 from a supply pipe 4. They are then propelled to a nozzle 7 by compressed air fed to the mixer 5 by way of a branch line 6, and discharged from the nozzle 7 with high inertia towards the surface of a work piece processed. As a result, the surface of the workpiece hardened and a compressive residual stress is produced therein, and minute irregularities are formed on the surface.

An alumina grain with an average grain size of 0.03 to 0.7 mm was used for the shots 3 for all of the test pieces from 2 to 12. The projection speed of the shots 3 (i.e. the initial speed of the shots 3 at discharge from the nozzle 7) was 32 to 180 m/sec. This projection speed was controlled by the opening of a control valve 8 in the branch pipe 6. The compressive residual stress, hardness and residual austenite content in the surface of the Test Pieces No. 1 to No. 7 and No. 9 to No. 12 was controlled on the basis of the projection speed.

With the products of the present invention, Test Pieces No. 1 to No. 5 were subjected to shot peening with the above mentioned alumina grains, and were then subjected to a second stage shot peening process using glass beads having lighter shots compared to the alumina grains (due to their lower density and smaller grain size). The average particle size for the shots used in the second shot peening process was less that 0.05 mm.

The reason for carrying out this second shot peening process using light weight shots was so that only the surface shape was changed (by forming minute irregularities having an equivalent roundness diameter of up to 15 μm) without affecting the hardness, residual stress and residual austenite content of the surface layer.

The inner peripheral surface of the outer ring of Test Piece No. 8, and Test Pieces No. 1 to No. 5 were subjected to superfinishing after the above-mentioned shot peening process, while Test Pieces Nos.6 and 7 and No. 9 to No. 12 were ended with the shot peening.

The shot peening process was simultaneously carried out for the eight test pieces so that eight practically identical test pieces were made for all of the conditions of surface layer hardness, surface layer residual stress, surface layer residual austenite content, surface area percentage of concavities and equivalent roundness diameter of the convexities.

Figure 2:
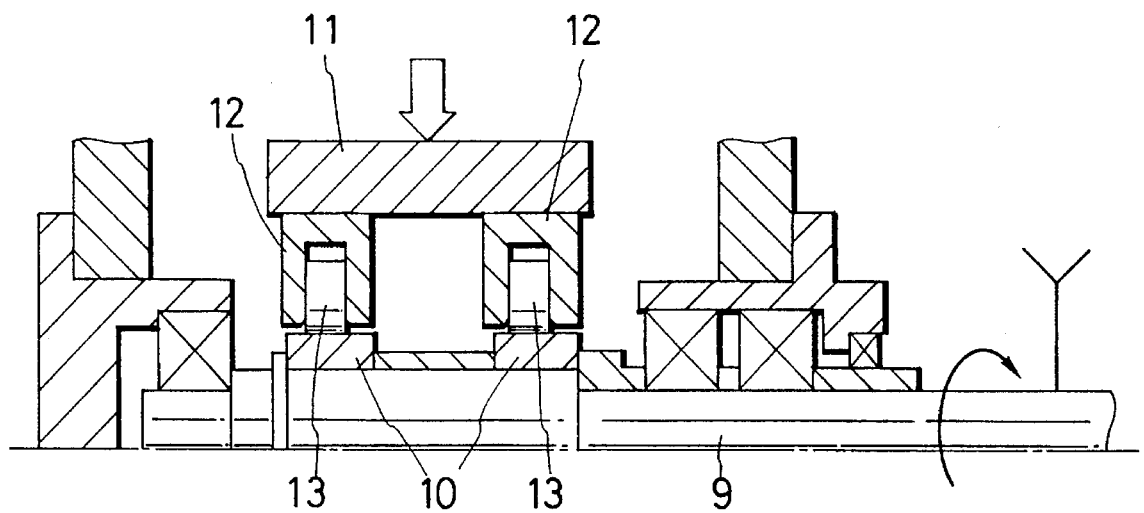
FIG. 2 is a cross-sectional view of an endurance testing device used for evaluation in the present invention.

The resultant eight test pieces for each of the 12 types from Test Piece No. 1 to No. 12 (i.e. a total of 96 test pieces), were then tested for endurance using the test apparatus shown in FIG. 2.

With the test apparatus, two mating rings 10 were fixed in spaced apart relation to each other at two places on the outer peripheral surface of a rotating shaft 9 driven by a motor. A pair of support members 12 are provided on one side of a pressure plate 11, at a spacing coinciding to that of the mating rings 10, Test pieces 13 were supported so as to be freely rotatably in the pair of support members, respectively in such a manner that the outer peripheral surfaces of the test pieces 13 were in contact with the outer peripheral surfaces of the mating rings 10. As a result, each of the test pieces 13 rotated with the rotation of the rotating shaft 9. Consequently, with the test apparatus of FIG. 2, two test pieces 13 could be tested for endurance at the same time.

The rotational speed of the rotating shaft 9 was controlled so as to give a rotational speed of 5100 rpm for each test piece 13, and the pressure plate 11 was urged towards the rotating shaft under a force of 356 kgf. Consequently, the contact portions between the outer peripheral faces of the test pieces 13, and the outer peripheral faces of the mating rings 10 were each subjected to a radial loading of 178 kgf. The outer peripheral face of the mating rings 10 prior to testing had a surface hardness of HRC 60 to 61, and an average surface roughness Ra of 0.38 to 0.45 μm. Lubrication of the surface portion was by splash lubrication with 10W-30 mineral oil.

The tests were carried out with a cut off at 400 hours. At predetermined intervals the tests were stopped and the outer peripheral surface of each of the test pieces 13 inspected for any occurrence of peeling. If peeling was observed, the endurance test for that test piece 13 was terminated at that time. These results are given in the beforementioned table as test cut off time. When the cut off times were different for the eight test pieces of the same type, then the time for the test piece having the shortest cut off time is given. Moreover, the cases wherein peeling had not occurred up to the end of 400 hour cut off time are also shown as 400 hours.

Determination of the equivalent roundness diameter of the convexities for a percentage area of concavities of 80% involved analysis of an image from a 200 power optical microscope. In this operation the image obtained using the optical microscope was subjected to image processing to enhance and clarify the outline, and the setting of the surface area percentage of the concavities was carried out by adjusting the illumination of a light source and adjusting a binary coding threshold. Determination of the convexities was carried with respect to the binary coded images extracting those exceeding the binary coding threshold (the illuminated part).

As can be seen from the results for the abovementioned endurance tests shown in the beforementioned table, sufficient peeling endurance was obtained with the rolling/sliding part specifically the outer peripheral surface of the outer ring of the present invention even under severe lubrication conditions. Furthermore, although not shown in the table, a relatively long time of 300 hours, compared to that for the comparative example, lapsed before the incidence of pitting, so that in this respect also, excellent durability was confirmed.

With the symbols given after the numerical values in the beforementioned tables, the symbol "0" indicates that the numerical value was within the limit range of the present invention, and the symbol "x"indicates that the numerical value was outside the limit range of the present invention. Also with the maximum residual stresses in the surface, the symbol "+" indicates a tensile residual stress, while the symbol "–" indicates a compressive residual stress.

Test Pieces No. 6 and No. 7 of the 7 types of comparative test pieces designated as Test Pieces No. 6 to No. 12 were not subjected to the second stage shot peening process. Consequently they had a large convexity equivalent roundness diameter with inadequate oil film formation. With Test Piece No. 8, as mentioned previously, the shot peening process was not carried out at all. With Test Piece No. 9 the second stage shot peening process was carried out. However, since the first stage shot peening process was not sufficient, the maximum residual stress of Test Piece No. 9 was inadequate. With Test Pieces No. 10 to No. 12, the second stage shot peening process was carried out. However since the first stage shot peening process was excessive, the hardness, maximum compressive residual stress and residual austenite content of Test Pieces No. 10 to No. 12 were all outside the limits of the present invention.

The test pieces were disassembled when the test was cut off, and the rolling surface or outer peripheral surface of the roller supporting the test pieces 13 was examined for the occurrence of peeling. Peeling was observed on the rolling surface of the roller in the case where the inner peripheral surface of the outer ring was subjected to shot peening only. However, no peening occurred in the super finished one.

In the rolling surface evaluation column of the Table, if the rolling surfaces of the all test pieces show no peening, a ○ symbol was recorded. If peeling occurred in at least one test piece, a x symbol was recorded.

The rolling/sliding part of the present invention exhibited excellent resistance to peeling even under severe lubrication conditions, making improved durability for various types of mechanical equipment possible. Useful and advantageous effects in the industrial field such as increased periods between mechanical equipment inspection, and the possibility of making equipment maintenance free may thus be demonstrated.

In the outer ring, for a cam follower of valve drive mechanism, of this invention made as described above, the outer peripheral surface of the outer ring is strengthened, and the surface roughness is formed so that an oil film could be formed on it easily, thus preventing the occurrence of peeling on the outer peripheral surface of the outer ring to make its life longer. Also, because the inner peripheral surface is super-finished, the roughness is very minute, and oil film parameter between the inner peripheral surface and the rolling surface of the super-finished rollers or the outer peripheral surface of the shaft, is very large, thus longer life of the shaft and rollers can be expected. Also, the durability of the entire cam follower apparatus, with an outer ring, is improved.

What is claimed is:

1. A rolling/sliding part for use in rolling/sliding contact with another part, having a surface which is formed with continuous minute irregularities of concavities and convexities thereon and controlled such that when a reference plane is positioned so that the concavities have a projected area which occupies 80% of the reference plane, the convexities projecting above the reference plane have respective equivalent roundness diameters of up to 15 μm; and a surface portion up to 50 μm in depth having a maximum compressive residual stress of 50 to 110 kgf/mm$^2$, a hardness of Hv 830 to 960, and a residual austenite content of at least 7% by volume.

2. An annular rolling/sliding part, having an outer peripheral surface to be in rolling/sliding contact with another first part and an inner peripheral surface to be in rolling/sliding contact with another second part, the outer peripheral surface formed with continuous minute irregularities of concavities and convexities thereon and controlled such that when a reference plane is positioned so that the concavities have a projected area which occupies 80% of the reference plane, the convexities projecting above the reference plane have respective equivalent roundness diameters of up to 15 μm and a surface portion up to 50 μm in depth which is controlled to have a maximum compressive residual stress of 50 to 110 kgf/mm$^2$, a hardness of Hv 830 to 960, and a residual austenite content of at least 7% by volume, and the inner peripheral surface being subjected to superfinishing.

3. The annular rolling/sliding part of claim 2, wherein the annular rolling/sliding part is a ring, the first part is a metal cam, and the second part is a metal shaft to support the ring.

* * * * *